(12) United States Patent
Liao et al.

(10) Patent No.: US 12,108,130 B2
(45) Date of Patent: Oct. 1, 2024

(54) IMAGE SENSOR LENS ASSEMBLY AND SENSING MODULE HAVING EXTERNALLY SEALED CONFIGURATION

(71) Applicant: AZUREWAVE TECHNOLOGIES, INC., New Taipei (TW)

(72) Inventors: Chih-Hao Liao, Taipei (TW); Meng-Hsin Kuo, New Taipei (TW)

(73) Assignee: AZUREWAVE TECHNOLOGIES, INC., New Taipei (TW)

( * ) Notice: Subject to any disclaimer, the term of this patent is extended or adjusted under 35 U.S.C. 154(b) by 106 days.

(21) Appl. No.: 18/113,129

(22) Filed: Feb. 23, 2023

(65) Prior Publication Data

US 2024/0214658 A1 Jun. 27, 2024

(30) Foreign Application Priority Data

Dec. 21, 2022 (TW) ................................ 111149069

(51) Int. Cl.
*H04N 23/54* (2023.01)
*H04N 23/55* (2023.01)

(52) U.S. Cl.
CPC ............. *H04N 23/54* (2023.01); *H04N 23/55* (2023.01)

(58) Field of Classification Search
None
See application file for complete search history.

(56) References Cited

U.S. PATENT DOCUMENTS

2018/0143395 A1* 5/2018 Takahashi .............. G03B 17/12

* cited by examiner

*Primary Examiner* — Mark T Monk
(74) *Attorney, Agent, or Firm* — Li & Cai Intellectual Property (USA) Office

(57) ABSTRACT

An image sensor lens assembly and a sensing module having an externally sealed configuration are provided. The sensing module includes an image sensor chip, a filtering sheet, a supporting layer sandwiched between the image sensor chip and the filtering sheet, a circuit board having a thru-hole, a first adhering layer, and a second adhering layer. The supporting layer is not enclosed and has a communication opening. The image sensor chip is fixed onto the circuit board, and the filtering sheet is partially arranged in the thru-hole so as to jointly form a ring-shaped gap therebetween that is in spatial communication with the communication opening. The first adhering layer having a shape of an enclosed loop is formed in the ring-shaped gap. The second adhering layer is connected to and seals the image sensor chip and the circuit board.

15 Claims, 13 Drawing Sheets

IMAGE SENSOR LENS ASSEMBLY AND SENSING MODULE HAVING EXTERNALLY SEALED CONFIGURATION

CROSS-REFERENCE TO RELATED PATENT APPLICATION

This application claims the benefit of priority to Taiwan Patent Application No. 111149069, filed on Dec. 21, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a sensor lens, and more particularly to an image sensor lens assembly and a sensing module having an externally sealed configuration.

BACKGROUND OF THE DISCLOSURE

In order to provide a conventional image sensing module with a dust-proof function, an image sensor chip and a filtering sheet of the conventional image sensing module are provided with a supporting layer therebetween that is in a shape of an enclosed loop for jointly defining an enclosed space. However, since the supporting layer of the conventional image sensing module can only be formed in the shape of the enclosed loop, development and structural improvements to the conventional image sensing module are greatly restricted. For example, as the image sensor chip of the conventional image sensing module is miniaturized, an adhesive space provided for the supporting layer is also reduced.

SUMMARY OF THE DISCLOSURE

In response to the above-referenced technical inadequacies, the present disclosure provides an image sensor lens assembly and a sensing module having an externally sealed configuration to effectively improve on the issues associated with conventional image sensing modules.

In order to solve the above-mentioned problems, one of the technical aspects adopted by the present disclosure is to provide an image sensor lens assembly, which includes a sensing module having an externally sealed configuration and an optical module. The sensing module includes an image sensor chip, a supporting layer, a filtering sheet, a circuit board, a first adhering layer, and a second adhering layer. Moreover, a top surface of the image sensor chip has a sensing region, a bonding region arranged outside of the sensing region, and a plurality of soldering pads that are arranged outside of the bonding region. The supporting layer is disposed on the bonding region. The supporting layer is not in a shape of an enclosed loop and has at least one communication opening. The filtering sheet is disposed on the supporting layer and shields the sensing region. The filtering sheet and the sensing region have a sensing space therebetween. The circuit board has a thru-hole and a plurality of bonding pads that are arranged outside of the thru-hole. The soldering pads of the image sensor chip are respectively soldered and fixed onto the bonding pads, and at least part of the filtering sheet passes through the thru-hole, so that the filtering sheet and an inner wall of the thru-hole have a ring-shaped gap therebetween that is in spatial communication with the at least one communication opening. The first adhering layer has a shape of an enclosed loop. The first adhering layer is formed in and seals the ring-shaped gap so as to adhere the filtering sheet to the circuit board. The second adhering layer is connected to and seals a periphery of the top surface of the image sensor chip and the circuit board, so that the sensing space and the ring-shaped gap are in spatial communication with each other through the at least one communication opening, and jointly define a sealed space. The optical module includes a frame assembled to the sensing module and at least one lens that is assembled in the frame. The optical module and the image sensor chip are respectively located at two opposite sides of the circuit board.

In order to solve the above-mentioned problems, another one of the technical aspects adopted by the present disclosure is to provide a sensing module having an externally sealed configuration. The sensing module includes an image sensor chip, a supporting layer, a filtering sheet, a circuit board, a first adhering layer, and a second adhering layer. Moreover, a top surface of the image sensor chip has a sensing region, a bonding region arranged outside of the sensing region, and a plurality of soldering pads that are arranged outside of the bonding region. The supporting layer is disposed on the bonding region. The supporting layer is not in a shape of an enclosed loop and has at least one communication opening. The filtering sheet is disposed on the supporting layer and shields the sensing region. The filtering sheet and the sensing region have a sensing space therebetween. The circuit board has a thru-hole and a plurality of bonding pads that are arranged outside of the thru-hole. The soldering pads of the image sensor chip are respectively soldered and fixed onto the bonding pads, and at least part of the filtering sheet passes through the thru-hole, so that the filtering sheet and an inner wall of the thru-hole have a ring-shaped gap therebetween that is in spatial communication with the at least one communication opening. The first adhering layer has a shape of an enclosed loop. The first adhering layer is formed in and seals the ring-shaped gap so as to adhere the filtering sheet to the circuit board. The second adhering layer is connected to and seals a periphery of the top surface of the image sensor chip and the circuit board, so that the sensing space and the ring-shaped gap are in spatial communication with each other through the at least one communication opening, and jointly define a sealed space.

In order to solve the above-mentioned problems, yet another one of the technical aspects adopted by the present disclosure is to provide a sensing module having an externally sealed configuration. The sensing module includes an image sensor chip, a supporting layer, a filtering sheet, a circuit board, a first adhering layer, and a second adhering layer. Moreover, a top surface of the image sensor chip has a sensing region, a bonding region arranged outside of the sensing region, and a plurality of soldering pads that are arranged outside of the bonding region. The supporting layer is disposed on the bonding region. The supporting layer is not in a shape of an enclosed loop and has at least one communication opening. The filtering sheet is disposed on the supporting layer and shields the sensing region. The filtering sheet and the sensing region have a sensing space therebetween. The circuit board has a thru-hole and a plurality of bonding pads that are arranged outside of the thru-hole. The soldering pads of the image sensor chip are respectively soldered and fixed onto the bonding pads, and at least part of the filtering sheet passes through the thru-hole, so that the filtering sheet and an inner wall of the thru-hole have a ring-shaped gap therebetween that is in spatial communication with the at least one communication opening. The first adhering layer is an adhesive tape that has a shape of an enclosed loop. The first adhering layer seals the ring-shaped gap and adheres the filtering sheet to the circuit board. The second adhering layer that is connected to and seals a periphery of the top surface of the image sensor chip and the circuit board, so that the sensing space and the ring-shaped gap are in spatial communication with each other through the at least one communication opening, and jointly define a sealed space.

Therefore, any one of the sensing module and the image sensor lens assembly in the present embodiment is provided with the first adhering layer and the second adhering layer, so that the sensing space does not need to be enclosed (or sealed), and the supporting layer is no longer overly limited in terms of structural configuration (e.g., the sensing module can be provided for facilitating the miniaturization of the image sensor chip). In other words, the supporting layer can have different structures according to design requirements, and the first adhering layer can be provided to facilitate a firm connection between the filtering sheet and the circuit board.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWINGS

The described embodiments may be better understood by reference to the following description and the accompanying drawings, in which.

DETAILED DESCRIPTION OF THE EXEMPLARY EMBODIMENTS

Figure 1:
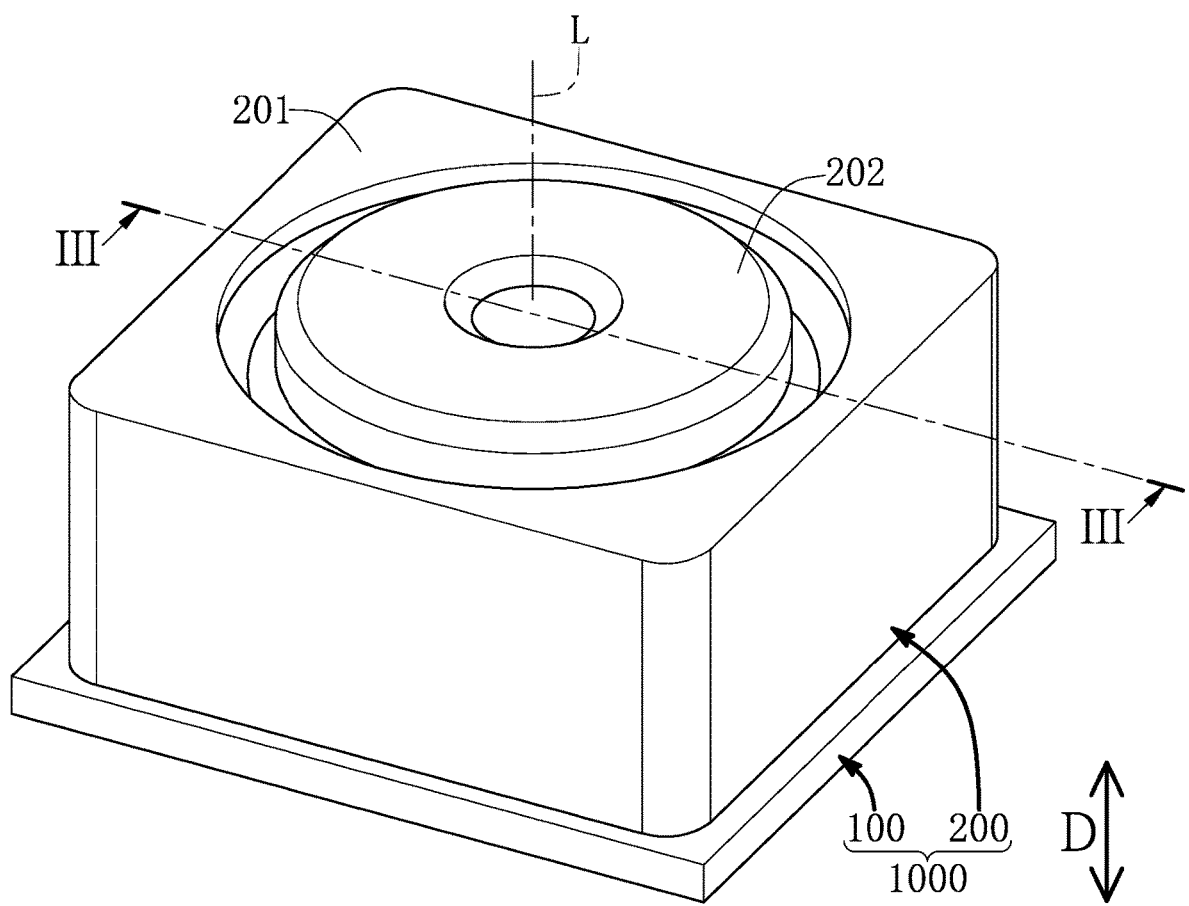
FIG. 1 is a schematic perspective view of an image sensor lens assembly according to a first embodiment of the present disclosure.

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a," "an" and "the" includes plural reference, and the meaning of "in" includes "in" and "on." Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first," "second" or "third" can be used to describe various components, signals or the like, which are for distinguishing one component/signal from another one only, and are not intended to, nor should be construed to impose any substantive limitations on the components, signals or the like.

First Embodiment

Figure 2:
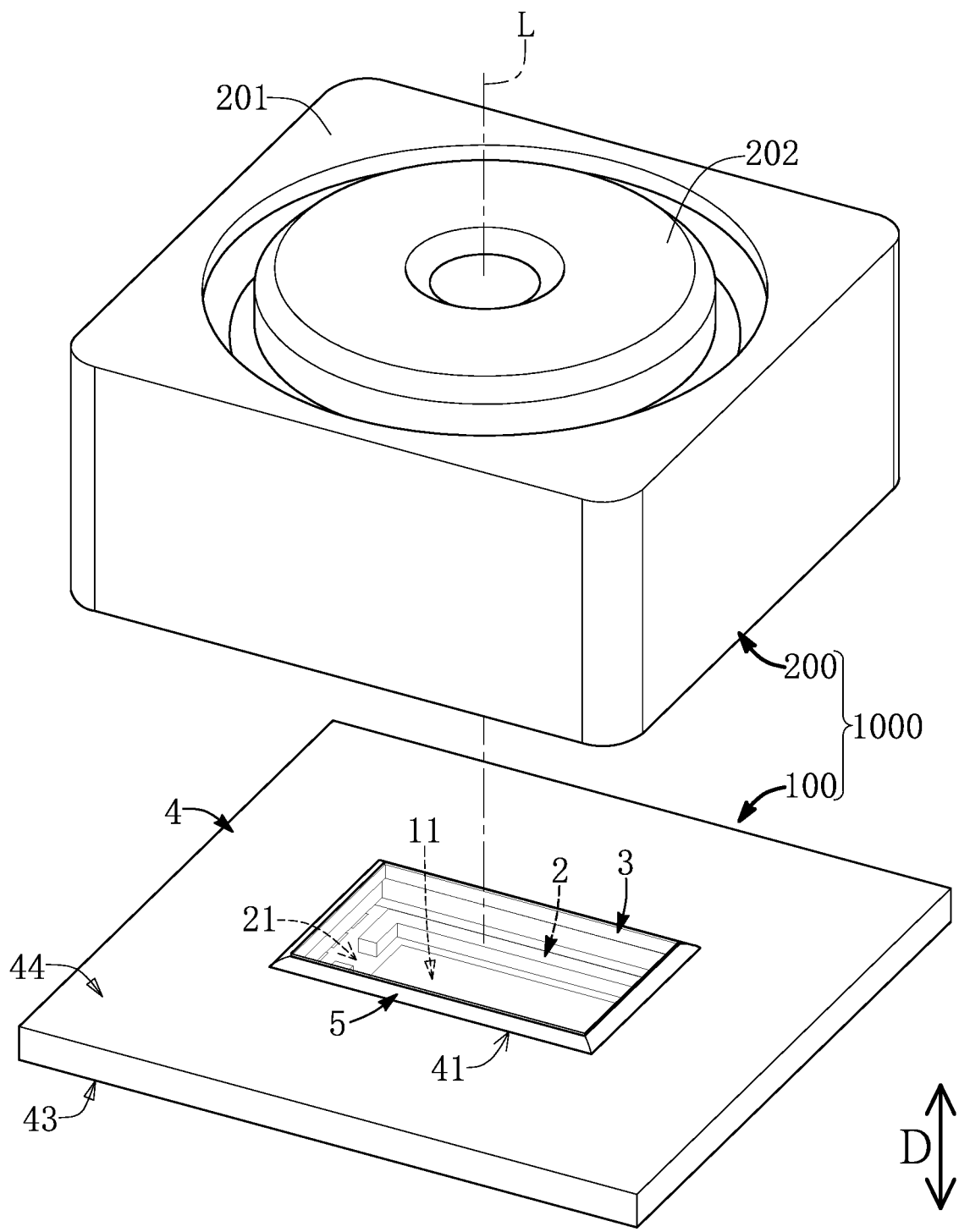
FIG. 2 is a schematic exploded view of FIG. 1.

Referring to FIG. 1 to FIG. 7, a first embodiment of the present disclosure is provided. As shown in FIG. 1 and FIG. 2, the present embodiment provides an image sensor lens assembly 1000, which includes a sensing module 100 having an externally sealed configuration and an optical module 200 that is assembled to the sensing module 100. It should be noted that any lens or any package structure not provided for image sensing is different from the image sensor lens assembly 1000 of the present embodiment.

Figure 3:
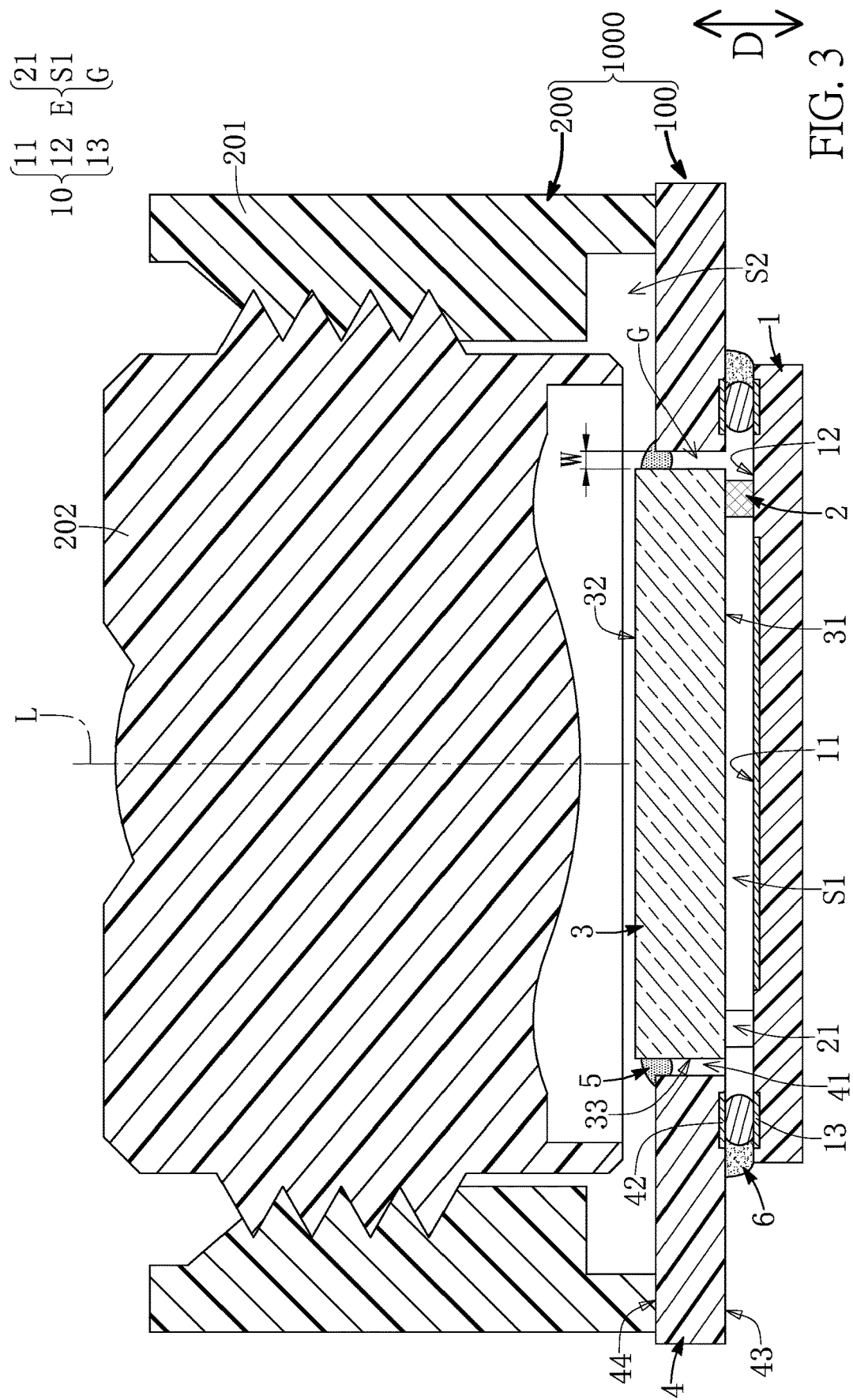
FIG. 3 is a schematic cross-sectional view taken along line III-III of FIG. 1.
Figure 4:
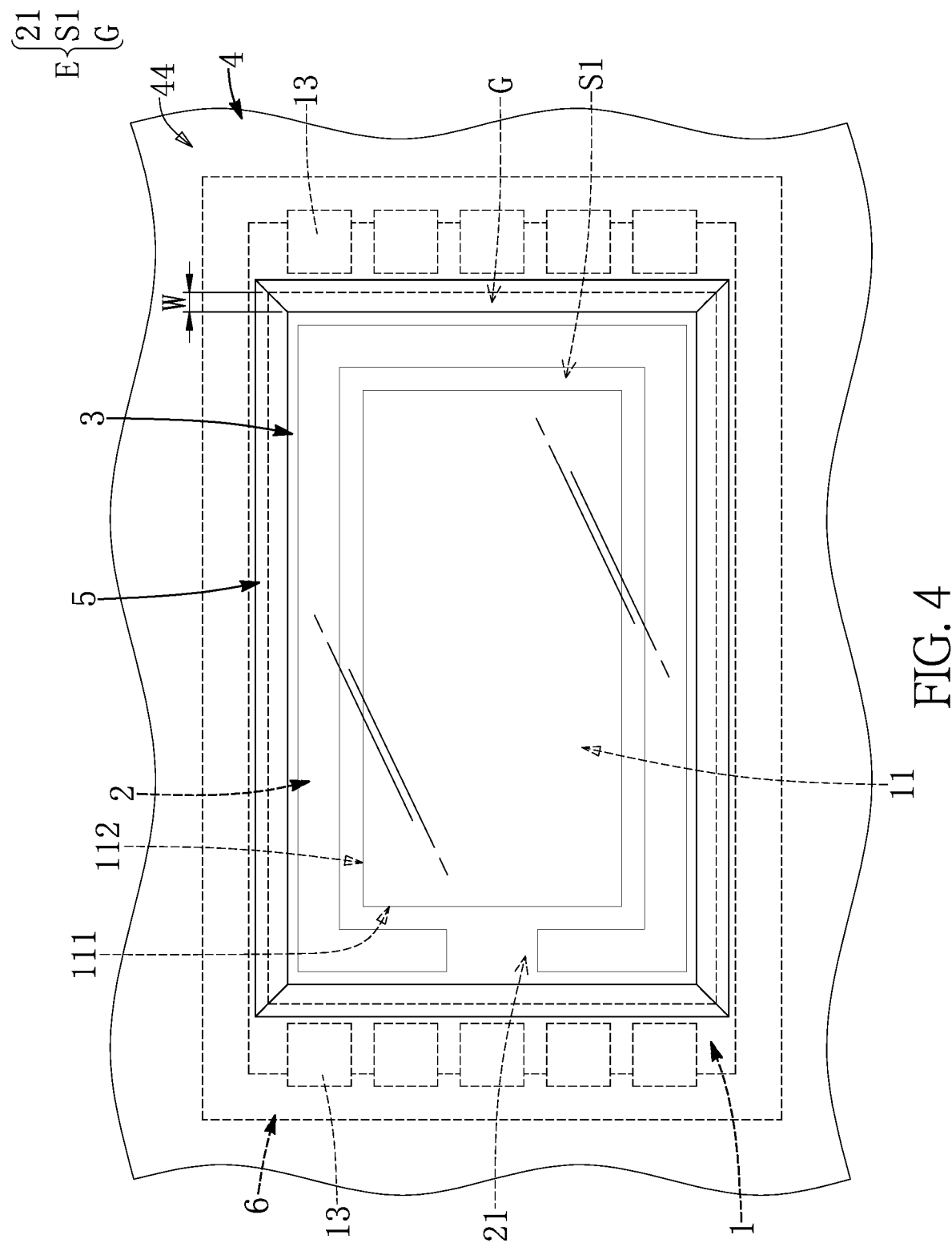
FIG. 4 is a schematic top view showing a sensing module having an externally sealed configuration of FIG. 1.

As shown in FIG. 3 and FIG. 4, the sensing module 100 includes an image sensor chip 1, a supporting layer 2 disposed on the image sensor chip 1, a filtering sheet 3 disposed on the supporting layer 2, a circuit board 4 carrying the image sensor chip 1, a first adhering layer 5 connected to the filtering sheet 3 and the circuit board 4, and a second adhering layer 6 that is connected to the image sensor chip 1 and the circuit board 4.

The image sensor chip 1 in the present embodiment can be a Complementary Metal-Oxide-Semiconductor (CMOS) sensor or any sensor having an image capturing function, but the present disclosure is not limited thereto. Moreover, a top surface 10 of the image sensor chip 1 has a sensing region 11, a bonding region 12 arranged outside of the sensing region 11, and a plurality of soldering pads 13 that are arranged outside of the bonding region 12.

In the present embodiment, the bonding region 12 surrounds the sensing region 11, and the soldering pads 13 are arranged in two rows respectively located at two opposite sides of the sensing region 11 (or the bonding region 12), but the present disclosure is not limited thereto. For example, in other embodiments of the present disclosure not shown in the drawings, the soldering pads 13 can be provided in a ring-shape arrangement surrounding the bonding region 12 according to design requirements; or, the soldering pads 13 can be provided in a U-shaped arrangement surrounding the bonding region 12 according to design requirements.

The supporting layer 2 (e.g., a glue layer) is disposed on the bonding region 12 of the image sensor chip 1. The supporting layer 2 is not in a shape of an enclosed loop and has at least one communication opening 21. In other words, any supporting layer or any glue layer having a shape of an enclosed loop is different from the supporting layer 2 of the present embodiment.

The filtering sheet 3 is disposed on the supporting layer 2 along a predetermined direction D and shields the sensing region 11. In other words, the supporting layer 2 is sandwiched between the bonding region 12 of the image sensor chip 1 and the filtering sheet 3. Furthermore, the filtering sheet 3 is preferably chosen to have properties corresponding to the sensing region 11 of the image sensor chip 1. For example, when a light passes through the optical module 200, the filtering sheet 3 is configured to enable a part of the light having wavelength corresponding to the sensing region 11 to pass therethrough.

Specifically, the filtering sheet 3 has an inner surface 31, an outer surface 32 being opposite to the inner surface 31, and a surrounding lateral surface 33 that is connected to the inner surface 31 and the outer surface 32. The inner surface 31 of the filtering sheet 3 is disposed on the supporting layer 2 and is substantially parallel to the top surface 10 of the image sensor chip 1, and the filtering sheet 3 and the sensing region 11 have a sensing space S1 therebetween that is in spatial communication with the at least one communication opening 21.

The circuit board 4 in the present embodiment is a flat shape and can be a printed circuit board (PCB), a flexible printed circuit (FPC) board, or a ceramic substrate, but the present disclosure is not limited thereto. The circuit board 4 has a lower surface 43 and an upper surface 44 that is opposite to the lower surface 43. The circuit board 4 has a thru-hole 41 and a plurality of bonding pads 42 that are arranged outside of the thru-hole 41 (and that are arranged on the lower surface 43).

In the present embodiment, the bonding pads 42 are arranged in two rows respectively located at two opposite sides of the thru-hole 41, and the bonding pads 42 respectively correspond in position to the soldering pads 13, but the present disclosure is not limited thereto. For example, in other embodiments of the present disclosure not shown in the drawings, the bonding pads 42 can be provided in a ring-shaped arrangement or a U-shaped arrangement according to design requirements, if the bonding pads 42 respectively correspond in position to the soldering pads 13.

Moreover, the soldering pads 13 of the image sensor chip 1 are respectively soldered and fixed onto the bonding pads 42, and at least part of the filtering sheet 3 passes through the thru-hole 41, so that the filtering sheet 3 and an inner wall of the thru-hole 41 have a ring-shaped gap G therebetween that is in spatial communication with the at least one communication opening 21.

Specifically, the outer surface 32 (and a part of the surrounding lateral surface 33) of the filtering sheet 3 in the present embodiment can be provided to protrude from the thru-hole 41 of the circuit board 4, and the second adhering layer 6 is connected to and seals a periphery of the top surface 10 of the image sensor chip 1 and the circuit board 4 (e.g., the lower surface 43), so that moisture or particles cannot pass through the connection interface between the image sensor chip 1 and the circuit board 4.

The first adhering layer 5 has a shape of an enclosed loop, and the first adhering layer 5 is formed in (a top part) of the ring-shaped gap G and seals the ring-shaped gap G so as to adhere the filtering sheet 3 to the circuit board 4. Accordingly, moisture or particles cannot enter into the sensing space S1 through the ring-shaped gap G. In other words, since the first adhering layer 5 and the second adhering layer 6 are provided in the above arrangement, the sensing space S1 and the ring-shaped gap G are in spatial communication with each other through the at least one communication opening 21 only, and jointly define a sealed space E. In the present embodiment, the first adhering layer 5 is formed by solidifying a material (e.g., a glue) that has a viscosity within a range from 1000 cps to 125000 cps, and a width of the ring-shaped gap G is less than or equal to 2000 μm, but the present disclosure is not limited thereto.

Moreover, as shown in FIG. 3 and FIG. 4, the first adhering layer 5 is adhered to the inner wall of the thru-hole 41 and the surrounding lateral surface 33 of the filtering sheet 3 (e.g., a top part of the surrounding lateral surface 33), and the first adhering layer 5 is preferably not in contact with the supporting layer 2 and the inner surface 31 of the filtering sheet 3, but the present disclosure is not limited thereto.

Figure 5:
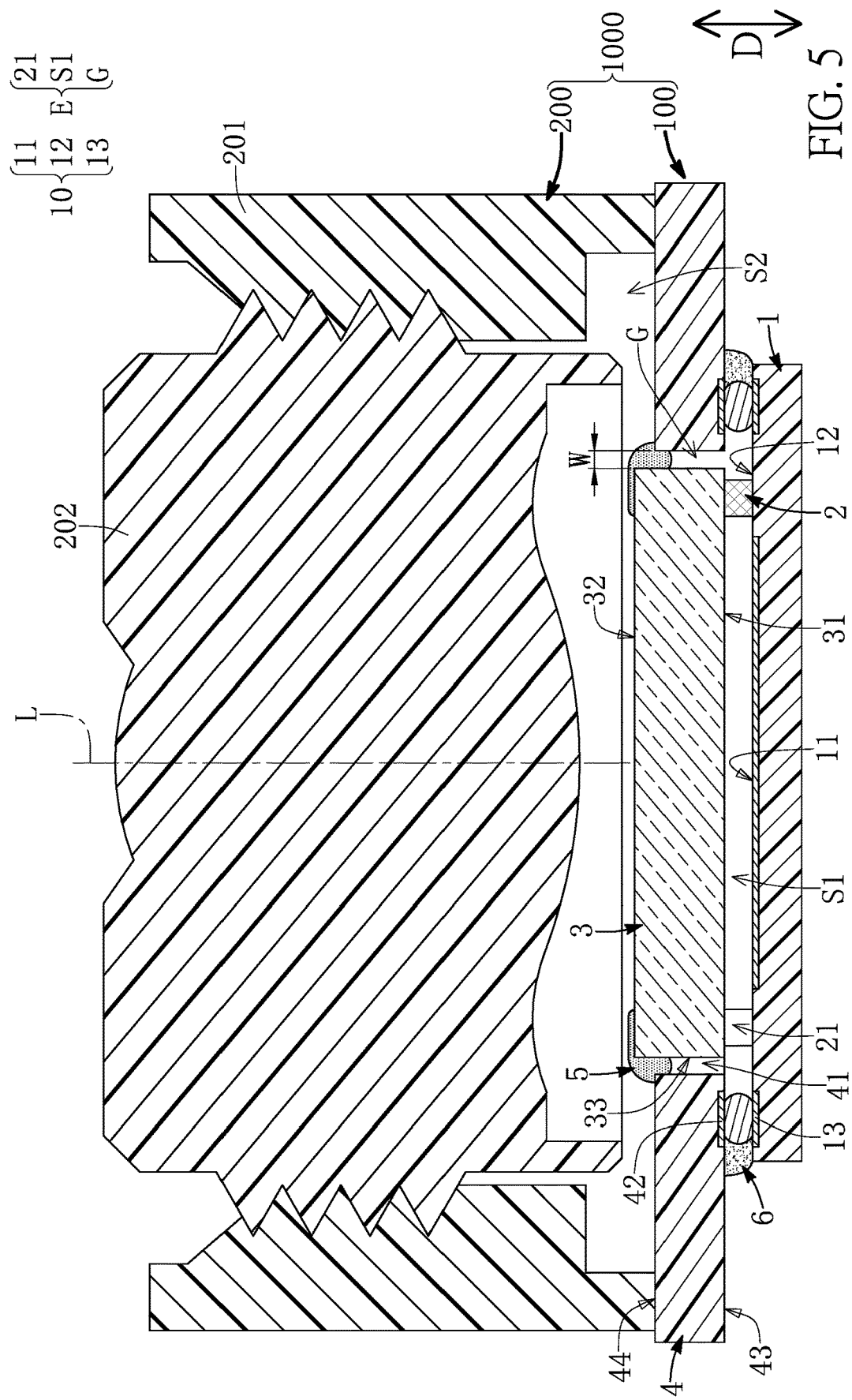
FIG. 5 is a schematic cross-sectional view showing the image sensor lens assembly of FIG. 3 in another configuration.

For example, as shown in FIG. 5, the first adhering layer 5 can further extend to a peripheral portion of the outer surface 32 of the filtering sheet 3 according to design requirements. In other words, the first adhering layer 5 is adhered to the inner wall of the thru-hole 41, the surrounding lateral surface 33 of the filtering sheet 3 (e.g., the top part of the surrounding lateral surface 33), and the peripheral portion of the outer surface 32 of the filtering sheet 3. Moreover, a projection region defined by orthogonally projecting the peripheral portion of the outer surface 32 (along the predetermined direction D) onto the top surface 10 needs to be located outside of the sensing region 11, thereby preventing a sensing accuracy of the sensing region 11 from being affected.

In summary, as shown in FIG. 3 and FIG. 4, the sensing module 100 (or the image sensor lens assembly 1000) in the present embodiment is provided with the first adhering layer 5 and the second adhering layer 6, so that the sensing space S1 does not need to be enclosed (or sealed), and the supporting layer 2 is no longer overly limited in terms of structural configuration. In other words, the supporting layer 2 can have different structures according to design requirements, and the first adhering layer 5 is provided to facilitate a firm connection between the filtering sheet 3 and the circuit board 4.

In addition, a size, position, and quantity of the at least one communication opening 21 can be adjusted or changed according to design requirements, thereby enabling the sensing module 100 to have a configuration that can meet different requirements. For example, the supporting layer 2 can be provided as shown in FIG. 4, FIG. 6A, FIG. 6B, or FIG. 7, and the supporting layer 2 covers 5% to 95% of an outer edge of the sensing region 11, but the present disclosure is not limited thereto.

Figure 6A:
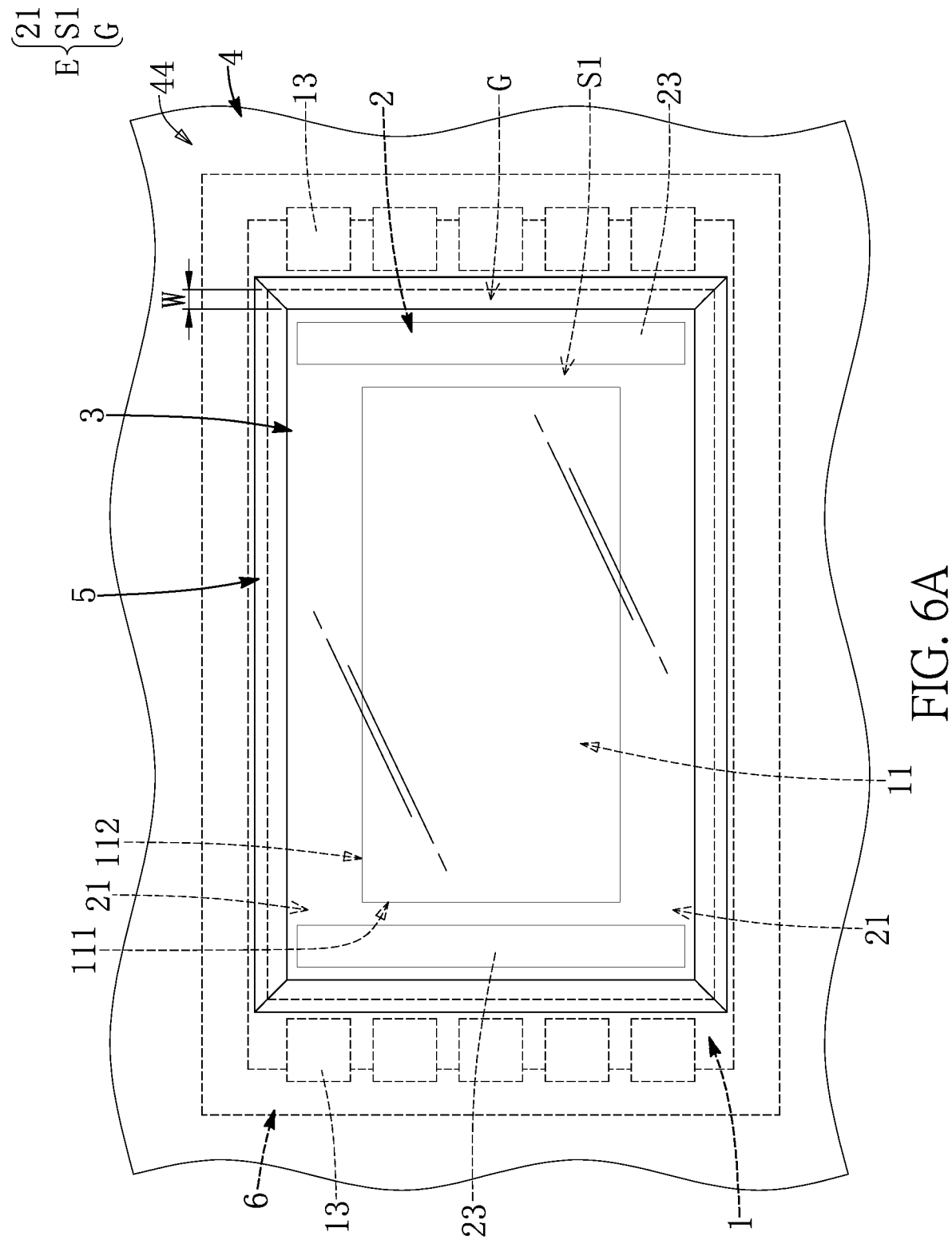
FIG. 6A is a schematic top view showing the sensing module of FIG. 4 in another configuration.
Figure 6B:
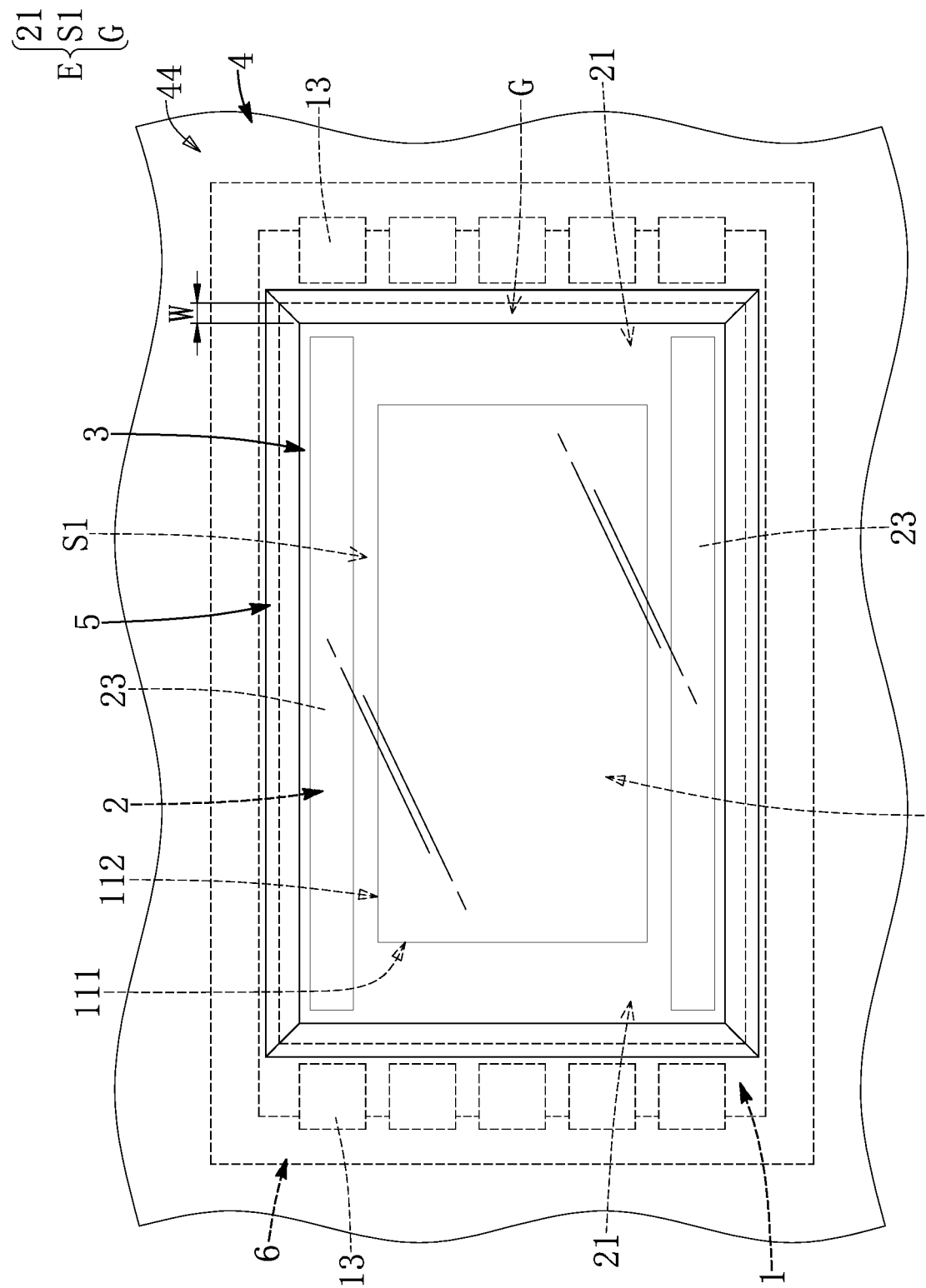
FIG. 6B is a schematic top view showing the sensing module of FIG. 4 in yet another configuration.
Figure 7:
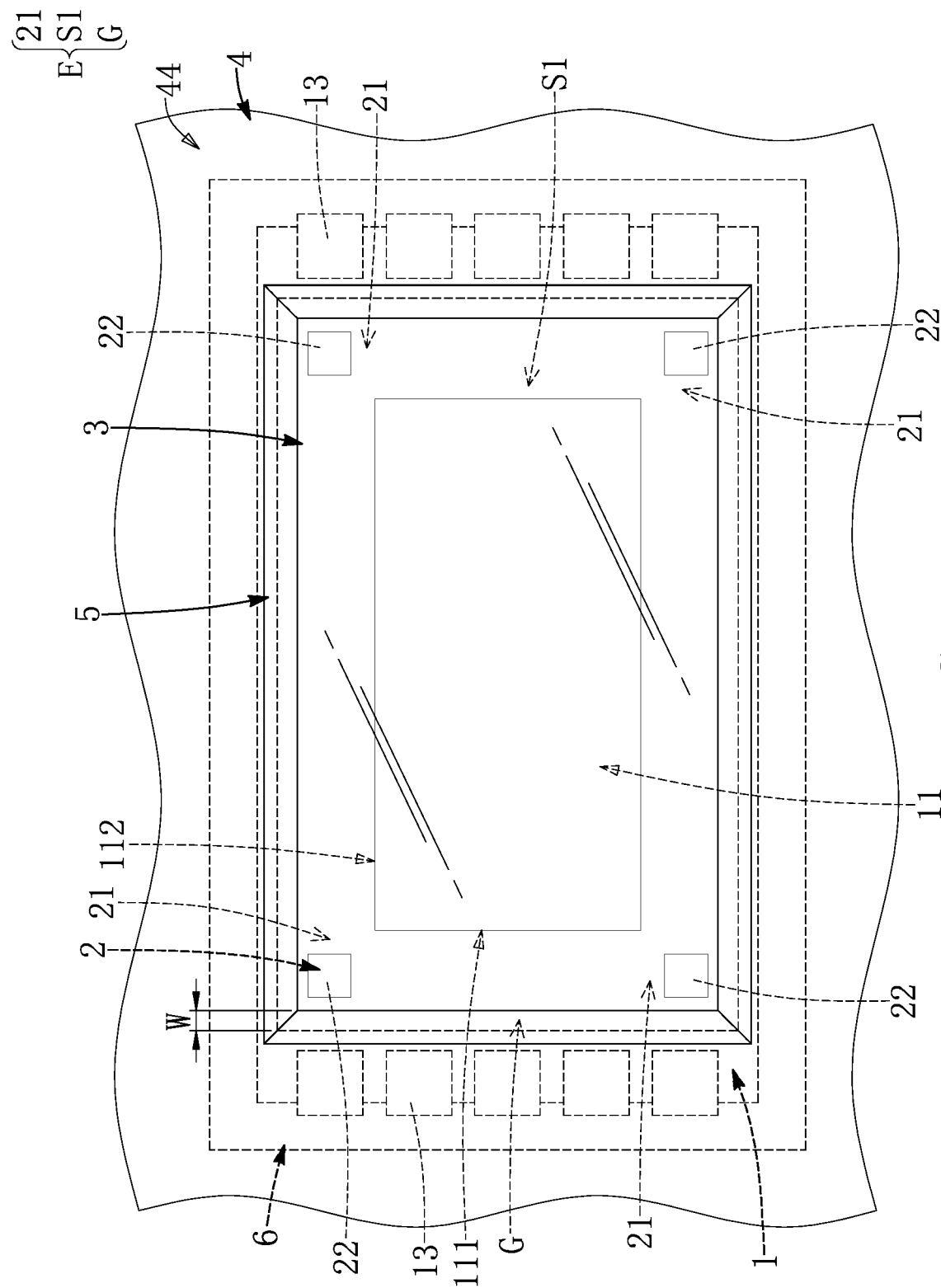
FIG. 7 is a schematic top view showing the sensing module of FIG. 4 in still yet another configuration.

Specifically, as shown in FIG. 4, the supporting layer 2 has a substantial C-shape having the communication opening 21. As shown in FIG. 6A and FIG. 6B, the outer edge of the sensing region 11 has two first edges 111 respectively arranged on two opposite sides thereof and two second edges 112 that are respectively arranged on another two opposite sides thereof. The soldering pads 13 are respectively arranged outside of the two first edges 111, and the supporting layer 2 includes two strips 23 that can be arranged between the two first edges 111 and the soldering pads 13 as shown in FIG. 6A (e.g., the two strips 23 are respectively arranged outside of the two first edges 111) or that can be respectively arranged outside of the two second edges 112 as shown in FIG. 6B according to design requirements, thereby forming the communication openings 21. Or, as shown in FIG. 7, the supporting layer 2 includes a plurality of columns 22 spaced apart from each other, two ends of each of the columns 22 are respectively connected to the bonding region 12 and the filtering sheet 3, and the bonding region 12 and each corner of the filtering sheet 3 are preferably provided with one of the columns 22.

As shown in FIG. 3 and FIG. 4, the optical module 200 includes a frame 201 assembled to the sensing module 100 and at least one lens 202 that is assembled in the frame 201. The optical module 200 and the image sensor chip 1 are respectively located at two opposite of the circuit board 4. In other words, the optical module 200 is fixed (e.g., adhered) onto the upper surface 44 of the circuit board 4 through the frame 201, and the image sensor chip 1 is fixed to the lower surface 43 of the circuit board 4.

Specifically, a central optical axis L of the at least one lens 202 passes through the sensing region 11 of the image sensor chip 1 (e.g., a center of the sensing region 11), and a space S2 surroundingly defined by the optical module 200 and the sensing module 100 is spatially isolated from the sealed space E (e.g., the ring-shaped gap G, the at least one communication opening 21, and the sensing space S1) by the first adhering layer 5. It should be noted that a quantity of the at least one lens 202 shown in the drawings of the present embodiment is one, but a quantity of the at least one lens 202 in other embodiments of the present disclosure not shown in the drawings can be more than one, in which the central optical axes L of the lenses 202 are substantially overlapped with each other.

In addition, the sensing module 100 in the present embodiment is described in cooperation with the optical module 200, but the present disclosure is not limited thereto. For example, in other embodiments of the present disclosure, the sensing module 100 can be independently used (e.g., sold) or can be used in cooperation with other components.

Second Embodiment

Figure 8:
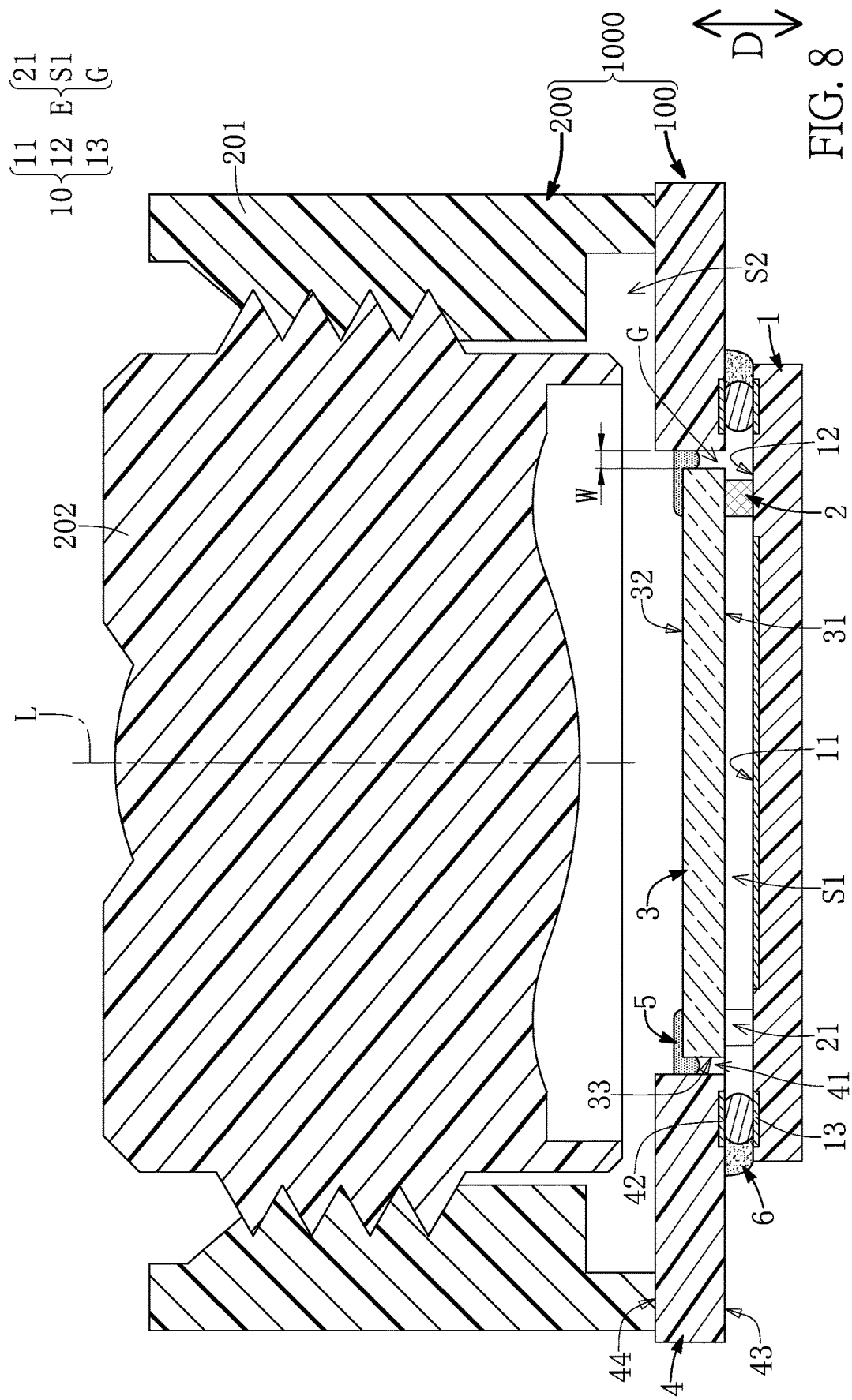
FIG. 8 is a schematic cross-sectional view of the image sensor lens assembly according to a second embodiment of the present disclosure.
Figure 9:
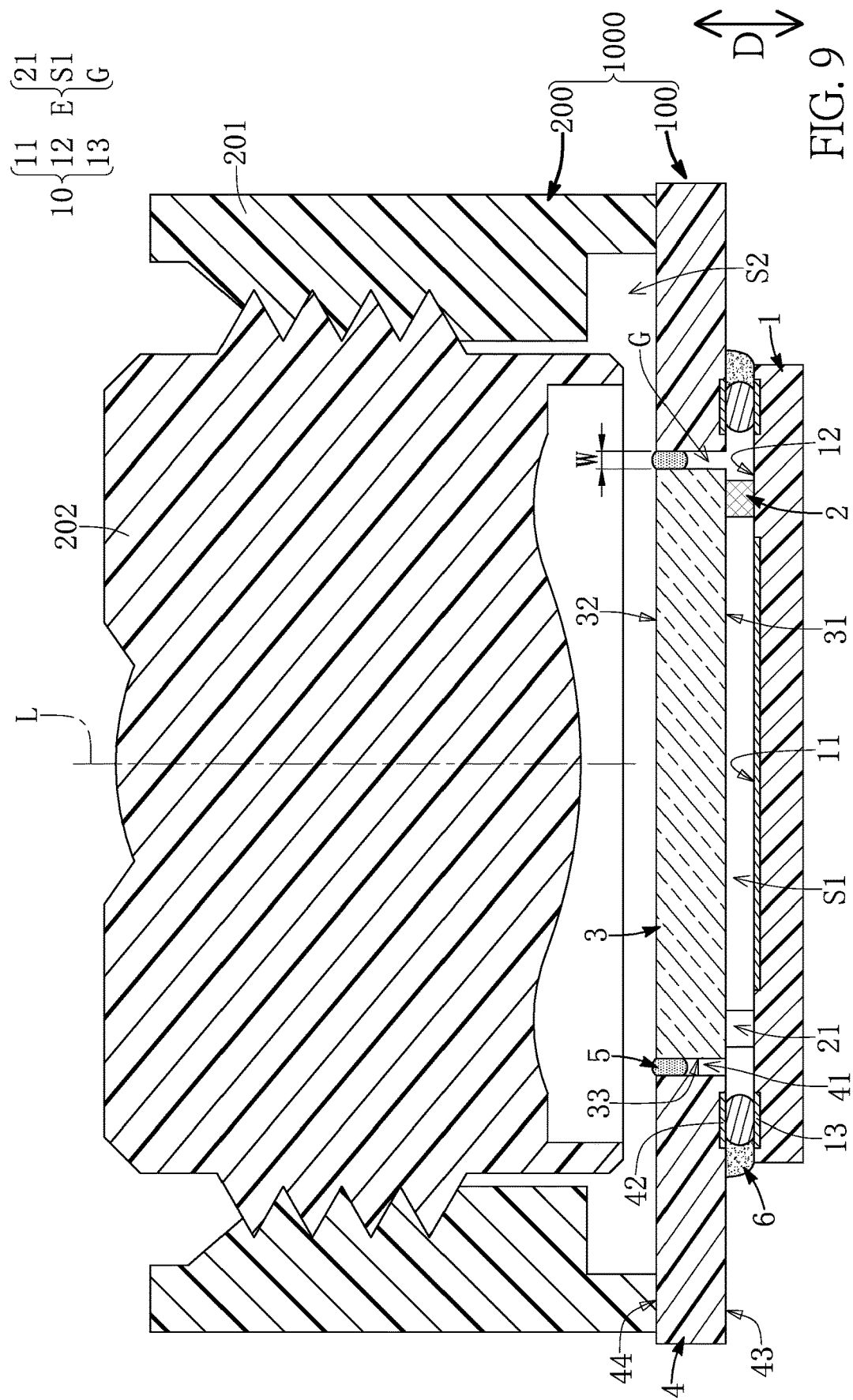
FIG. 9 is a schematic cross-sectional view of the image sensor lens assembly in another configuration according to the second embodiment of the present disclosure.

Referring to FIG. 8 and FIG. 9, a second embodiment of the present disclosure, which is similar to the first embodiment of the present disclosure, is provided. For the sake of brevity, descriptions of the same components in the first and second embodiments of the present disclosure will be omitted herein, and the following description only discloses different features between the first and second embodiments.

In the present embodiment, the filtering sheet 3 is entirely located in the thru-hole 41 (e.g., the outer surface 32 of the filtering sheet 3 is located in the thru-hole 41, and the outer surface 32 of the filtering sheet 3 is flush with or lower than the upper surface 44 of the circuit board 4), and the first adhering layer 5 is adhered to the inner wall of the thru-hole 41 and the surrounding lateral surface 33 of the filtering sheet 3 (e.g., a top part of the surrounding lateral surface 33).

In addition, as shown in FIG. 8, the first adhering layer 5 can further extend to a peripheral portion of the outer surface 32 of the filtering sheet 3 according to design requirements. In other words, the first adhering layer 5 is adhered to the inner wall of the thru-hole 41, the surrounding lateral surface 33 of the filtering sheet 3, and the peripheral portion of the outer surface 32 of the filtering sheet 3. Moreover, a projection region defined by orthogonally projecting the peripheral portion of the outer surface 32 (along the predetermined direction D) onto the top surface 10 is located outside of the sensing region 11.

Third Embodiment

Figure 10:
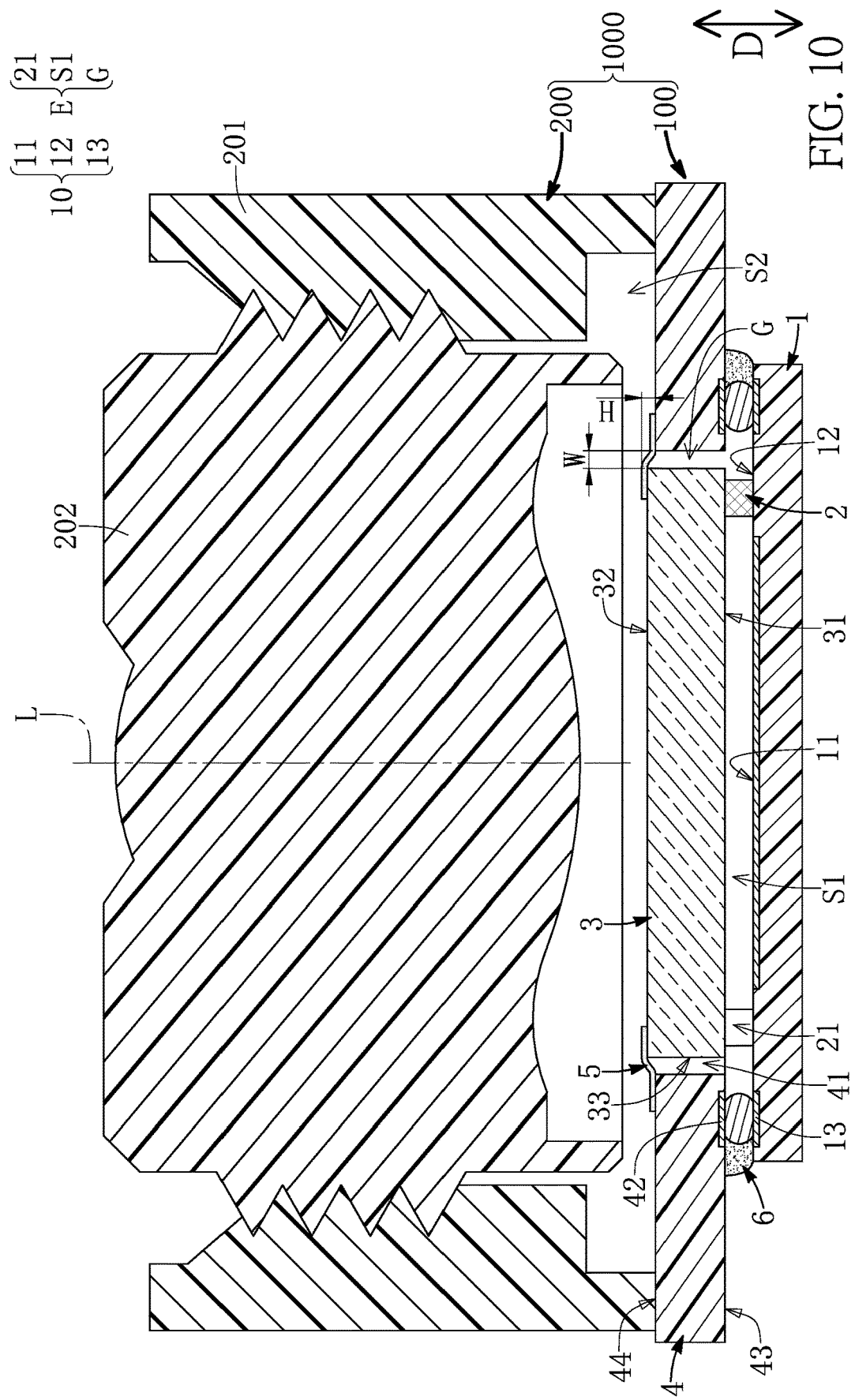
FIG. 10 is a schematic cross-sectional view of the image sensor lens assembly according to a third embodiment of the present disclosure.
Figure 11:
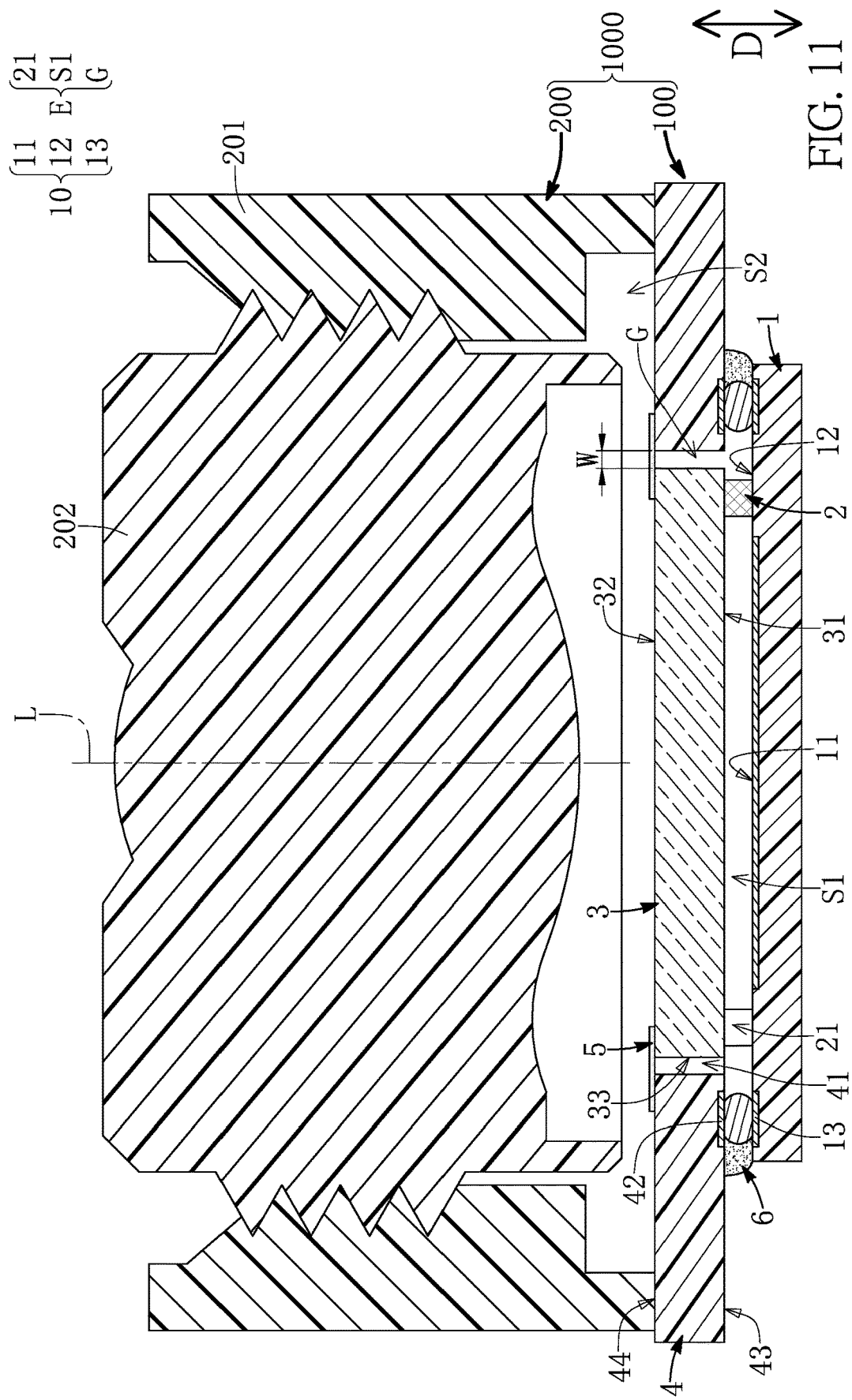
FIG. 11 is a schematic cross-sectional view of the image sensor lens assembly in another configuration according to the third embodiment of the present disclosure.

Referring to FIG. 10 and FIG. 11, a third embodiment of the present disclosure, which is similar to the first and second embodiments of the present disclosure, is provided. For the sake of brevity, descriptions of the same components in the first to third embodiments of the present disclosure will be omitted herein, and the following description only discloses different features among the third embodiment and the first and second embodiments.

In the present embodiment, the first adhering layer 5 is an adhesive tape that has a shape of an enclosed loop, and the first adhering layer 5 seals the ring-shaped gap G and adheres the filtering sheet 3 to the circuit board 4. Moreover, along the predetermined direction D, a difference H between the outer surface 32 of the filtering sheet 3 and the upper surface 44 of the circuit board 4 is less than or equal to 1000 μm for facilitating use of the first adhering layer 5.

As shown in FIG. 10, the outer surface 32 of the filtering sheet 3 is slightly higher than the upper surface 44 of the circuit board 4, and as shown in FIG. 11, the outer surface 32 of the filtering sheet 3 is coplanar with the upper surface 44 of the circuit board 4, but the present disclosure is not limited thereto. For example, in other embodiments of the present disclosure not shown in the drawings, the outer surface 32 of the filtering sheet 3 can be slightly lower than the upper surface 44 of the circuit board 4.

Specifically, the first adhering layer 5 is adhered to a peripheral portion of the outer surface 32 of the filtering sheet 3 and the upper surface 44 of the circuit board 4. Moreover, a projection region defined by orthogonally projecting the peripheral portion of the outer surface 32 along the predetermined direction D onto the top surface 10 is located outside of the sensing region 11.

In addition, since the first adhering layer 5 in the present embodiment is the adhesive tape in a solid mode, a width W of the ring-shaped gap G can be changed according to design requirements and is less limited by the first adhering layer 5.

Fourth Embodiment

Figure 12:
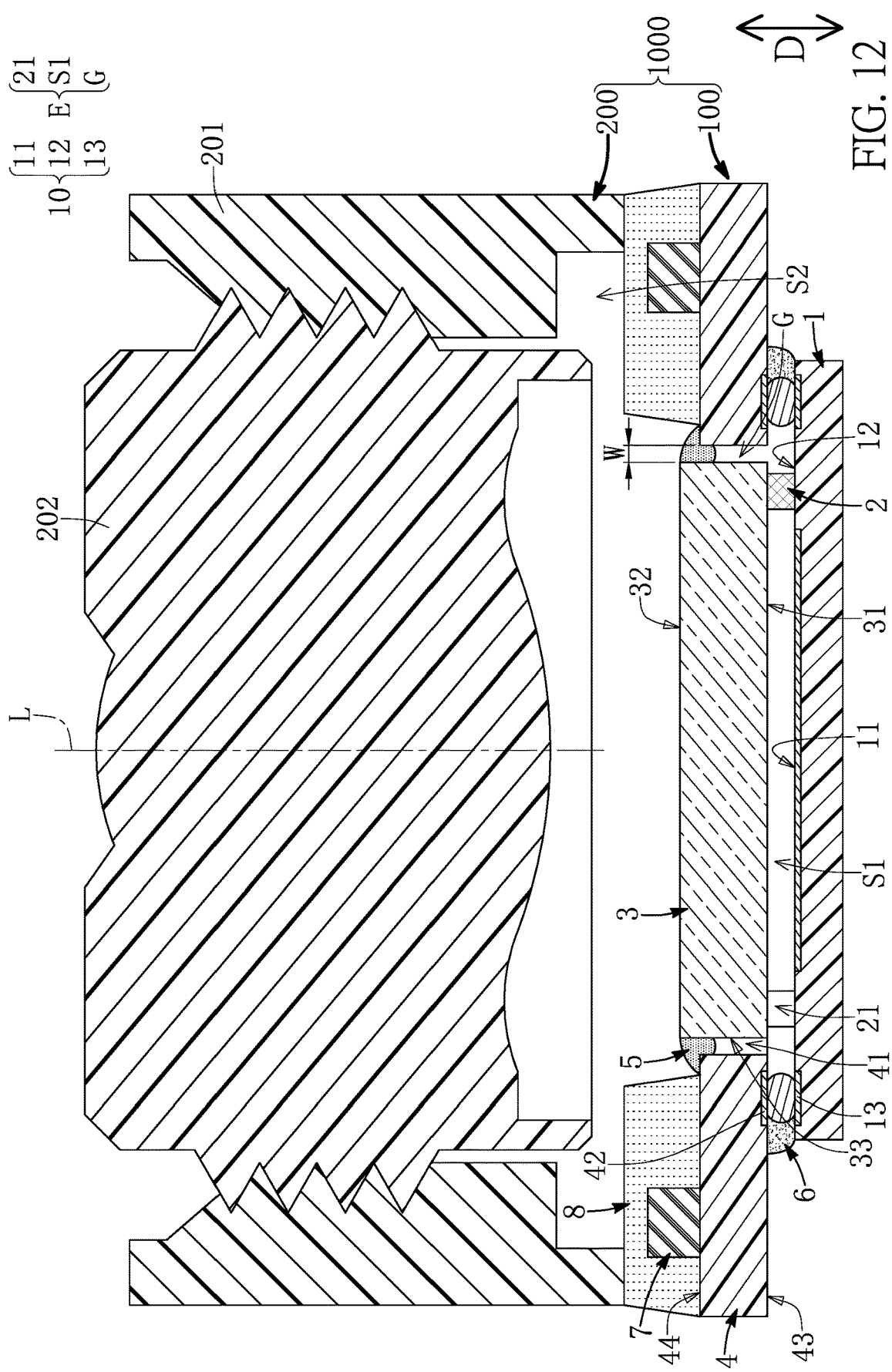
FIG. 12 is a schematic cross-sectional view of the image sensor lens assembly according to a fourth embodiment of the present disclosure.

Referring to FIG. 12, a fourth embodiment of the present disclosure, which is similar to the first to third embodiments of the present disclosure, is provided. For the sake of brevity, descriptions of the same components in the first to fourth embodiments of the present disclosure will be omitted herein, and the following description only discloses different features among the fourth embodiment and the first to third embodiments.

In the present embodiment, the sensing module 100 further includes at least one electronic component 7 and an encapsulant layer 8. The at least one electronic component 7 is assembled to the circuit board 4 (e.g., the upper surface 44) and is electrically coupled to the image sensor chip 1 through the circuit board 4.

Moreover, the encapsulant layer 8 is formed on the circuit board 4 (e.g., the upper surface 44), and the at least one electronic component 7 is embedded in the encapsulant layer 8. Moreover, an inner edge of the encapsulant layer 8 is blocked by the first adhering layer 5. The encapsulant layer 8 can be a molding compound, and the optical module 200 is assembled (e.g., adhered) and fixed onto the encapsulant layer 8 through the frame 201.

Beneficial Effects of the Embodiments

In conclusion, any one of the sensing module and the image sensor lens assembly in the present embodiment is provided with the first adhering layer and the second adhering layer, so that the sensing space does not need to be enclosed (or sealed), and the supporting layer is no longer overly limited in terms of structural configuration (e.g., the sensing module can be provided for facilitating the miniaturization of the image sensor chip). In other words, the supporting layer can have different structures according to design requirements, and the first adhering layer can be provided to facilitate the firm connection between the filtering sheet and the circuit board.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An image sensor lens assembly, comprising:
   a sensing module having an externally sealed configuration and including:
      an image sensor chip, wherein a top surface of the image sensor chip has a sensing region, a bonding region arranged outside of the sensing region, and a plurality of soldering pads that are arranged outside of the bonding region;
      a supporting layer disposed on the bonding region, wherein the supporting layer is not in a shape of an enclosed loop and has at least one communication opening;
      a filtering sheet disposed on the supporting layer and shielding the sensing region, wherein the filtering sheet and the sensing region have a sensing space therebetween;
      a circuit board having a thru-hole and a plurality of bonding pads that are arranged outside of the thru-hole, wherein the soldering pads of the image sensor chip are respectively soldered and fixed onto the bonding pads, and at least part of the filtering sheet passes through the thru-hole, so that the filtering sheet and an inner wall of the thru-hole have a ring-shaped gap therebetween that is in spatial communication with the at least one communication opening;
      a first adhering layer having a shape of an enclosed loop, wherein the first adhering layer is formed in and seals the ring-shaped gap so as to adhere the filtering sheet to the circuit board; and
      a second adhering layer that is connected to and seals a periphery of the top surface of the image sensor chip and the circuit board, so that the sensing space and the ring-shaped gap are in spatial communication with each other through the at least one communication opening, and jointly define a sealed space; and
   an optical module including a frame assembled to the sensing module and at least one lens that is assembled in the frame, wherein the optical module and the image sensor chip are respectively located at two opposite sides of the circuit board.

2. The image sensor lens assembly according to claim 1, wherein a central optical axis of the at least one lens passes through the sensing region of the image sensor chip, and a space surroundingly defined by the optical module and the sensing module is spatially isolated from the ring-shaped gap and the sensing space by the first adhering layer.

3. The image sensor lens assembly according to claim 1, wherein the supporting layer includes a plurality of columns spaced apart from each other, and two ends of each of the columns are respectively connected to the bonding region and the filtering sheet.

4. The image sensor lens assembly according to claim 1, wherein the sensing region has two first edges respectively arranged on two opposite sides thereof and two second edges that are respectively arranged on another two opposite sides thereof, and wherein the soldering pads are respectively arranged outside of the two first edges, and the supporting layer includes two strips that are respectively arranged outside of the two first edges or the two second edges.

5. The image sensor lens assembly according to claim 1, wherein the supporting layer covers 5% to 95% of an outer edge of the sensing region.

6. The image sensor lens assembly according to claim 1, wherein the filtering sheet has an inner surface disposed on the supporting layer, an outer surface being opposite to the inner surface, and a surrounding lateral surface that is connected to the inner surface and the outer surface, and wherein the first adhering layer is not in contact with the supporting layer and the inner surface of the filtering sheet, the first adhering layer is formed by solidifying a material that has a viscosity within a range from 1000 cps to 125000 cps, and a width of the ring-shaped gap is less than or equal to 2000 μm.

7. The image sensor lens assembly according to claim 6, wherein the first adhering layer is adhered to the inner wall of the thru-hole, the surrounding lateral surface of the filtering sheet, and a peripheral portion of the outer surface of the filtering sheet, and a projection region defined by orthogonally projecting the peripheral portion of the outer surface onto the top surface is located outside of the sensing region.

8. The image sensor lens assembly according to claim 1, wherein the sensing module further includes:
   at least one electronic component assembled to the circuit board and electrically coupled to the image sensor chip through the circuit board; and an encapsulant layer formed on the circuit board, wherein the at least one electronic component is embedded in the encapsulant layer, and an inner edge of the encapsulant layer is blocked by the first adhering layer, and wherein the optical module is assembled and fixed onto the encapsulant layer through the frame.

9. A sensing module having an externally sealed configuration, comprising:
  an image sensor chip, wherein a top surface of the image sensor chip has a sensing region, a bonding region arranged outside of the sensing region, and a plurality of soldering pads that are arranged outside of the bonding region;
  a supporting layer disposed on the bonding region, wherein the supporting layer is not in a shape of an enclosed loop and has at least one communication opening;
  a filtering sheet disposed on the supporting layer and shielding the sensing region, wherein the filtering sheet and the sensing region have a sensing space therebetween;
  a circuit board having a thru-hole and a plurality of bonding pads that are arranged outside of the thru-hole, wherein the soldering pads of the image sensor chip are respectively soldered and fixed onto the bonding pads, and at least part of the filtering sheet passes through the thru-hole, so that the filtering sheet and an inner wall of the thru-hole have a ring-shaped gap therebetween that is in spatial communication with the at least one communication opening;
  a first adhering layer having a shape of an enclosed loop, wherein the first adhering layer is formed in and seals the ring-shaped gap so as to adhere the filtering sheet to the circuit board; and
  a second adhering layer that is connected to and seals a periphery of the top surface of the image sensor chip and the circuit board, so that the sensing space and the ring-shaped gap are in spatial communication with each other through the at least one communication opening, and jointly define a sealed space.

10. The sensing module according to claim 9, wherein the filtering sheet has an inner surface disposed on the supporting layer, an outer surface being opposite to the inner surface, and a surrounding lateral surface that is connected to the inner surface and the outer surface, wherein the first adhering layer is not in contact with the supporting layer and the inner surface of the filtering sheet, the first adhering layer is formed by solidifying a material that has a viscosity within a range from 1000 cps to 125000 cps, and a width of the ring-shaped gap is less than or equal to 2000 μm, and wherein the supporting layer covers 5% to 95% of an outer edge of the sensing region.

11. A sensing module having an externally sealed configuration, comprising:
  an image sensor chip, wherein a top surface of the image sensor chip has a sensing region, a bonding region arranged outside of the sensing region, and a plurality of soldering pads that are arranged outside of the bonding region;
  a supporting layer disposed on the bonding region, wherein the supporting layer is not in a shape of an enclosed loop and has at least one communication opening;
  a filtering sheet disposed on the supporting layer and shielding the sensing region, wherein the filtering sheet and the sensing region have a sensing space therebetween;
  a circuit board having a thru-hole and a plurality of bonding pads that are arranged outside of the thru-hole, wherein the soldering pads of the image sensor chip are respectively soldered and fixed onto the bonding pads, and at least part of the filtering sheet passes through the thru-hole, so that the filtering sheet and an inner wall of the thru-hole have a ring-shaped gap therebetween that is in spatial communication with the at least one communication opening;
  a first adhering layer being an adhesive tape that has a shape of an enclosed loop, wherein the first adhering layer seals the ring-shaped gap and adheres the filtering sheet to the circuit board; and
  a second adhering layer that is connected to and seals a periphery of the top surface of the image sensor chip and the circuit board, so that the sensing space and the ring-shaped gap are in spatial communication with each other through the at least one communication opening, and jointly define a sealed space.

12. The sensing module according to claim 11, wherein the filtering sheet has an inner surface disposed on the supporting layer, an outer surface being opposite to the inner surface, and a surrounding lateral surface that is connected to the inner surface and the outer surface, wherein the circuit board has a lower surface, and an upper surface that is opposite to the lower surface, and wherein the bonding pads are arranged on the lower surface, and the first adhering layer is adhered to a peripheral portion of the outer surface of the filtering sheet and the upper surface of the circuit board.

13. The sensing module according to claim 12, wherein a projection region defined by orthogonally projecting the peripheral portion of the outer surface along a predetermined direction onto the top surface is located outside of the sensing region.

14. The sensing module according to claim 13, wherein, along the predetermined direction, a difference between the outer surface of the filtering sheet and the upper surface of the circuit board is less than or equal to 1000 μm.

15. The sensing module according to claim 13, wherein the outer surface of the filtering sheet is coplanar with the upper surface of the circuit board.

* * * * *